Aug. 13, 1940.                G. S. LANE                2,211,136
                           BRAKE ADJUSTMENT
                       Filed Feb. 21, 1936            2 Sheets-Sheet 1
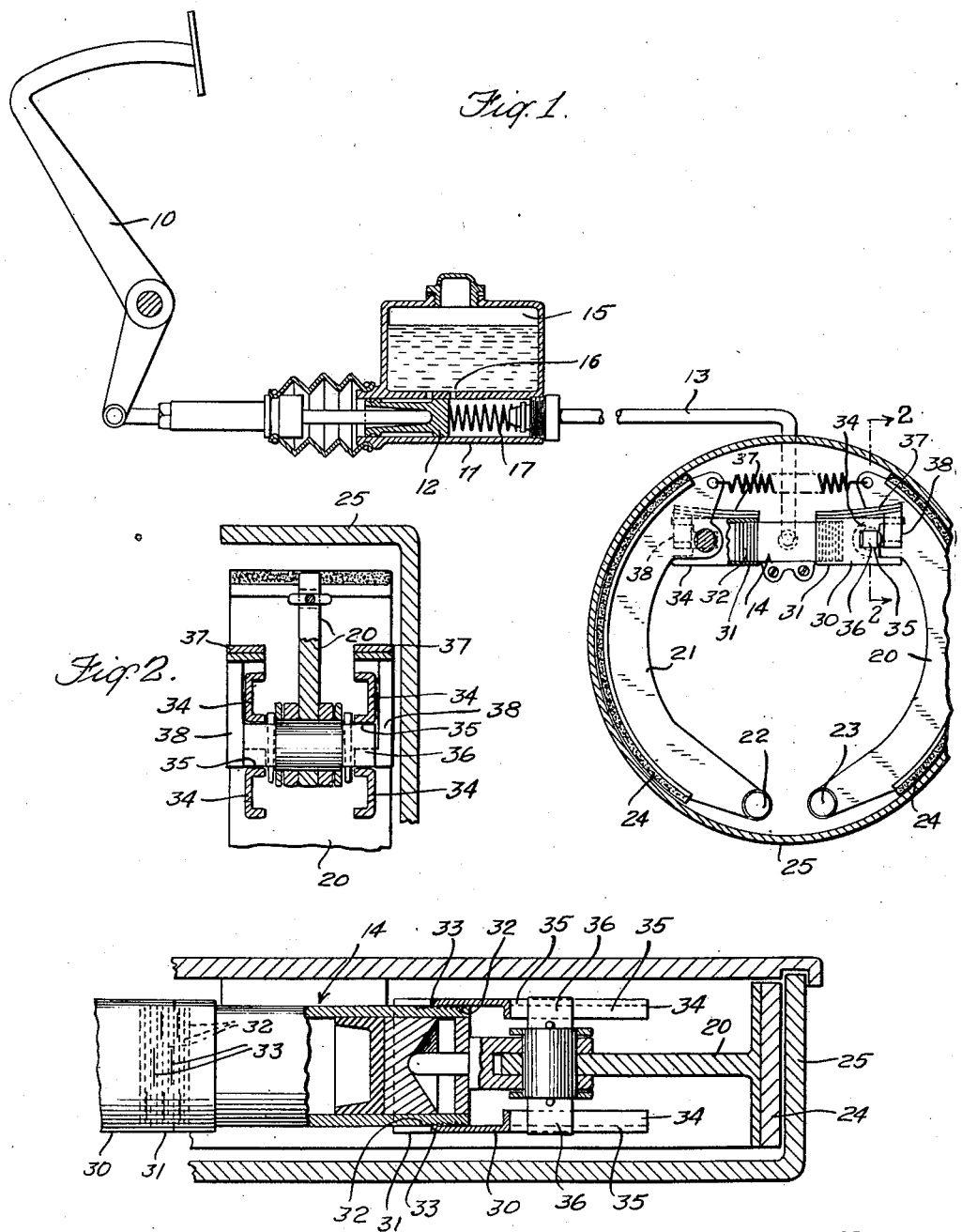
INVENTOR
GEORGE S. LANE
BY
ATTORNEYS Aug. 13, 1940.    G. S. LANE    2,211,136
BRAKE ADJUSTMENT
Filed Feb. 21, 1936    2 Sheets-Sheet 2
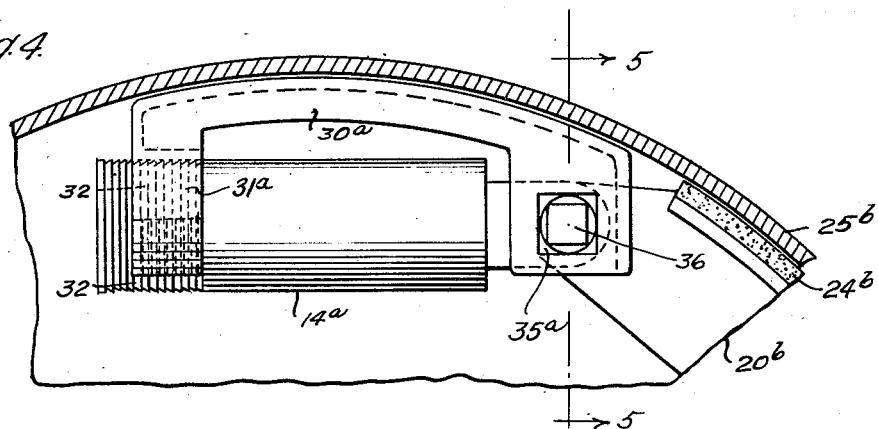
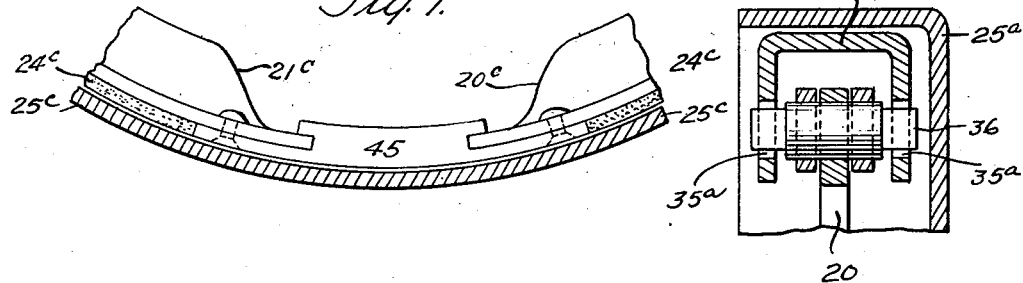
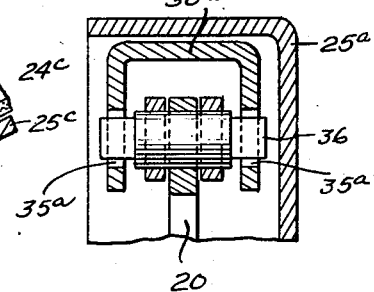
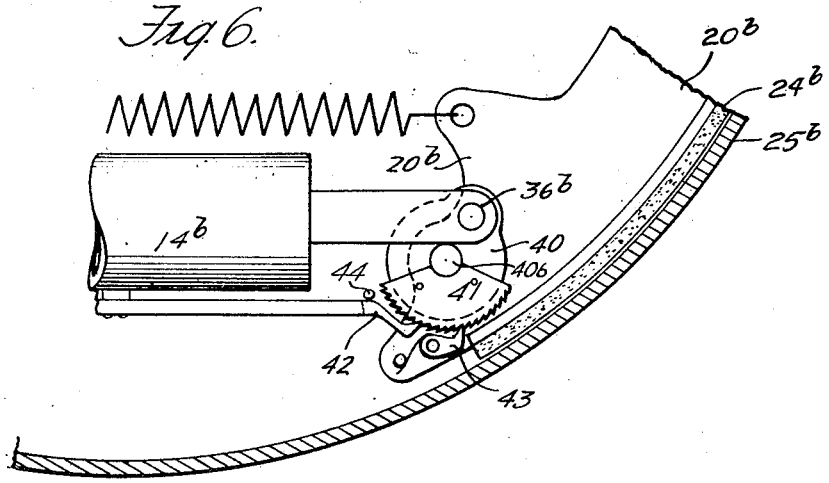
INVENTOR
GEORGE S. LANE
BY
ATTORNEYS Patented Aug. 13, 1940

2,211,136

UNITED STATES PATENT OFFICE 2,211,136

BRAKE ADJUSTMENT

George S. Lane, Schenevus, N. Y.

Application February 21, 1936, Serial No. 65,049

2 Claims. (Cl. 188—79.5)

This invention relates to brake mechanisms and more particularly to devices and methods for adjustment of brake mechanisms to compensate for wear while avoiding false adjustments due to thermal expansion upon over-heating of the parts.

Prior to my invention it has been recognized that the keeping of brakes in proper adjustment is a major problem. Due to the ever mounting toll of highway accidents, a large proportion of which are due to faulty brake adjustment, great effort has been concentrated upon the development of brakes which will stay in adjustment better and longer, and especially, a great deal of effort pior to my invention has been directed toward the development of brakes which would be self-adjusting. Numerous automatic take-up devices have been suggested and patented and tried out in actual practice. In general these operate by some sort of ratchet device which allows the normal proper amplitude of movement between two parts of the braking mechanism without adjustment; but when this amplitude increases, a tooth of the ratchet is engaged and a small adjustment is effected automatically. Such devices operate satisfactorily so long as the brakes are used only intermittently and at low speeds, so that there is no excessive over-heating of the brake drum. The difficulty which has prevented such devices from coming into practical use has been that when the brakes are used for a quick stop from very high speed or for holding down the speed on a long hill, the brake drum may become so far over-heated as to expand and permit an excessive amplitude of movement, which normally would indicate wear requiring adjustment, even though such wear does not exist and the increased amplitude is due entirely to the thermal expansion. When this occurs the adjustment, of course, becomes too tight and as soon as the drums have cooled the wheels will be locked and a major mechanical operation will be required before the car can again be operated.

It is an object of the present invention to overcome these difficulties and provide for the automatic adjustment of braking mechanism which will not be subject to false operations under the influence of thermal expansion.

With this and other objects in view, as will appear from the following specification, I have found that it is possible so to combine thermostatic means responsive to the temperature of the drum with automatic take-up devices that the take-up is either rendered inoperative or is adjusted to compensate for the greater amplitude resulting from thermal expansion when the drums are over-heated.

In the accompanying drawings I have illustrated several preferred examples of my invention. These examples have been chosen with a view to illustrating fully the principle and the best way of embodying it in practice in order that others skilled in the art may fully understand the invention and may apply it in widely varying forms according to the requirements of various particular situations in which it may be used. These drawings and the accompanying specification are, of course, not intended to be exhaustive, but on the contrary are intended to enable others skilled in the art to use the invention in many and various different forms.

Fig. 1 is a diagrammatic view partly in section of an automotive brake system.

Fig. 2 shows a fragmentary cross-section taken on line 2—2 of Fig. 1.

Fig. 3 shows a fragmentary cross-section taken at right angles to Fig. 2 through the axis of the brake operating motor.

Fig. 4 is a fragmentary view showing in elevation a modification which may replace the corresponding parts in Fig. 1.

Fig. 5 shows a fragmentary cross-section taken on line 5—5 of Fig. 4.

Fig. 6 is a fragmentary view showing in elevation another modification which may replace corresponding parts of Figs. 1 and 4.

Fig. 7 is a fragmentary view showing in elevation a thermostatic device and cooperating brake parts, which may be used instead of the thermostatic devices shown in the other figures.

In Figure 1, I have shown diagrammatically a conventional hydraulic brake mechanism to which my invention has been applied. The foot pedal by which the brake is operated is represented at 10. The master cylinder 11 contains a piston 12 operated by the foot pedal and communicates at one end with the pressure line 13 by which it is connected to the fluid pressure motors 14 at the wheel brakes. A reservoir 15 above the cylinder 11 carries an additional supply of pressure fluid; and, in order that the system may at all times be kept filled with the fluid, this reservoir communicates with the cylinder 11 through the breather opening 16, whenever the piston 12 is in the retracted position. The spring 17 in the master cylinder 11 holds the piston 12 in the retracted position whenever the foot pedal 10 is released and thus permits the readjustment of the liquid between the cylinder 11 and reservoir 15 and assures that the entire stroke of the pedal 10 will be communicated through the master cylinder to the fluid pressure motors 14.

In the example illustrated, a brake is shown in which primary and secondary shoes 20 and 21 are mounted on anchoring pivots 22 and 23. Each of these is faced with a brake lining material 24 which forms the actual surface of frictional engagement with the brake drum 25. The ends of the shoes 20 and 21 opposite to the anchors 22 and 23 are pivotally connected to the opposite piston rods of the fluid pressure motor 14.

Thus far the system is a conventional one in common use in motor cars of standard commercial manufacture. According to my invention, this system is modified by placing over one or both ends of the motor 14 a stop member 30. This stop member is provided with a tubular end 31 adapted to fit snugly over the outside of the motor cylinder 14. The end of the motor cylinder is provided with ratchet grooves 32 and the sleeve 31 is provided with ratchet detents 33, which may be merely portions of the metal stamped from the sleeve and turned inwardly to engage in the ratchet grooves. These detents are preferably positioned as shown, i. e., so that while one is aligned with a groove so as to make engagement therewith others are out of alignment with their nearest grooves by varying amounts so that a vernier effect is produced; and, upon movement of the sleeve 31 a distance less than the width of one groove 32, a different tooth 33 will engage and hold the new position, and almost any position can be held substantially exactly by one tooth aligning itself with one groove.

Beyond the sleeve 31 the member 30 is extended in two stop fingers 34 slotted as shown at 35. Within the slot 35 is an extension 36 on the pivot through which the piston rod engages the brake shoe 20.

A bimetallic thermostatic strip 37 is secured to the sleeve on the side toward the brake drum and carries at its opposite end a catch 38 which at normal temperatures is held in the path of the extension 36. The surface of this thermostatic strip which is toward the brake drum is preferably blackened and/or roughened to improve the efficiency of its heat exchange therewith.

In the operation of this device any normal use of the brake before excessive wear has occurred takes place while the pivot 36 is within the scope allowed in the slot 35 by the stop 38. As soon as the wear on the lining and on the inside of the drum has progressed to such an extent that the pivot 36 tends to go beyond the scope allowed by the slot 35 then the pivot contacts the catch 38 and pulls the member 30 over the motor cylinder 14 until one of the detents 33 has engaged in another groove 32.

After this the full return of the piston rod is prevented because the pivot 36 contacts against the ends of the slot 35.

When the pedal 10 returns to its normal position there will not be enough fluid to fill the system because of the fact that the piston rod is now held out by the member 30 so that it leaves a larger space in the motor cylinder 14. This, however, is immediately taken care of by an inflow of fluid from the reservoir 15 through the breather opening 16; and thereafter the brake will operate with the same amplitude as before, but beginning from the new position established by the stop member 30. Although the foot pedal 10 is operated through the same range of movement, the corresponding movement of the brake shoes is automatically advanced toward the drum to compensate for the wear.

This adjustment progresses step by step as the lining wears.

If, however, the pivot 36 moves substantially beyond its normal range because of thermal expansion of the brake drum, no corresponding adjustment of the member 30 will result because at the same time, the thermostatic finger 37 will have been heated from the drum and consequently will have flattened enough to remove the catch 38 from the path of the pivot 36.

It is also possible to dispense with the thermostatically operated catch 37—38 by use of a member which is thermostatically responsive to the temperature of the brake drum. Such a member is shown at 30a in Figure 4. In this case the slot 35a is closed at both ends so that the amplitude of movement of the pin 36 in the slot 35a is absolutely limited; but, because of the thermal expansion properties of the member 30a itself, the end of the slot 35a will be extended by thermal expansion at the same time that the drum is expanded, and thus a readjustment of the member 30a due to thermal expansion of the drum is avoided.

In order to obtain the necessary extension of the member 30a, it is preferably longer than in the case illustrated in Figure 1; and, for the same reason, it is preferably made of a material having a high co-efficient of expansion, as for example, zinc, aluminum, bronze or other alloy of high expansion co-efficient or even a molded plastic, which may be made of much higher co-efficient than metal (for example, vulcanite or hard rubber).

In the form illustrated the member 30a is provided at one end with arcuate fingers 31a which are provided on their inner surfaces near their free ends with grooves complimentary with the grooves 32 formed on the end of the cylinder 14a, but as shown in the drawings these grooves are preferably of different widths than the groove 32 so that as already described in connection with Fig. 1 a vernier effect is produced and with excessive movement less than the width of one tooth successive teeth will be separately engaged. These fingers are made on a circle only very slightly smaller than the circumference of the cylinder 14a so that they are pressed against the grooved end 32 by their own inherent resiliency. Between the portions 31a which embrace the cylinder 14a and the slots 35a the member 30a is formed in an arcuate channel fitted as closely as possible to the inner face of the brake drum; and in order that this member may have little heat capacity and therefore be quickly responsive to changes of temperature in the drum, it is formed in U-section to give strength and rigidity with a minimum amount of material. The bottom of the U is preferably close to the surface of the drum.

In Figure 6, I have shown another type of automatic take-up which may be used with either hydraulic or mechanical brakes. It is shown in this case with the hydraulic brake because these are now in most common use, but it will be readily understood by those skilled in the art that the cylinder 14b in this case is merely representative of any type of operating mechanism whether mechanical, electrical, or hydraulic. This operating mechanism is connected to the brake shoe 20b by a pivot 36b which in turn is secured in an eccentric position to the member 40 rotatable in the end of the shoe 20b about a pivot 40b.

At the other side of the member 40 is secured a segment of a ratchet wheel 41. A pawl 42 is secured at a point with respect to which the shoe 20b is moved when it is operated. In the present case it is shown secured to the motor cylinder 14b. A detent 43 holds the ratchet against rocking under the influence of pawl 42.

In the operation of this device, the normal braking movement of the shoe 20b occurs within the scope of the width of a single tooth on the ratchet 41. Thus the member 40 remains in the same position; and, as the shoe 20b moves back and forth, a single tooth of the ratchet 41 rides under the point of the pawl 42. If, however, due to wear, the shoe 20b moves beyond this limited scope then the pawl 42 drops behind the next tooth and on the return stroke moves the ratchet 41 thus producing the necessary adjustment to compensate for the wear.

In order that this action may not result from mere thermal expansion of the drum the pawl 42 is, or is associated with, a thermostatic element responsive to the temperature of the drum. In the case illustrated, the pawl 42 may be a bimetallic strip, similar to the strip 37 shown in Figure 1, and this may be arranged so that upon heating it will lift away from the ratchet and therefore be rendered inoperative to adjust the eccentric so long as the brake drum remains overheated. A fixed pin 44 may be provided to take the pressure of the thermostatic pawl 42 when it is subjected to very low temperature. This, however, is not essential if the detent 43 is used.

In Figure 7, I have illustrated another thermostatic device for preventing false adjustment by an automatic take-up device. In this case, either the take-up device illustrated in Figure 1 or that illustrated in Figure 4 may be used without a thermostatic element. The ratchet in this case will operate to adjust the brake whenever the movement of the shoe exceeds a predetermined range, but in this case a thermostatic element 45 is positioned between the ends of the shoes replacing a part of a circular shoe or the spacer between ordinary spaced shoes 20c and 21c.

The spacer 45 is made of zinc, aluminum or other high co-efficient of expansion material. e. g., alloy or plastic material, as already discussed above. When the brake drum over-heats, its heat is transmitted to the member 45, which being of a material with higher co-efficient of expansion than the brake drum, expands sufficiently to compensate for the expansion of the drum and to adjust the brake shoes so that they will take hold substantially as before within the same range of pedal movement. In this way any excessive movement of the automatic take-up device is avoided and consequently false adjustment by operation of the take-up device is also avoided.

It is to be understood, as already pointed out above, that these examples which have been given in the accompanying drawings and discussed above are intended only as examples, and that they may be varied in numerous ways. For example, while I have shown an automatic take-up on only one shoe in order to simplify the drawings and facilitate their understanding, it will be understood that this mechanism may be duplicated and a similar take-up provided on each shoe. However, especially where the operating device is a mechanism which provides automatic compensation between the two shoes, as is the case with the hydraulic motor in the examples illustrated, it will ordinarily be an unnecessary complication to duplicate this mechanism.

I have used the word "ratchet" broadly to include any device capable of permitting motion in one direction while preventing motion in an opposite direction.

What I claim is:

1. In a brake mechanism the combination of friction braking elements including a retarded means and retarding means in combination with an automatic adjusting device comprising a stop adjacent an element movable with the retarding means, and means on said element positioned and adapted to engage said stop respectively at the beginning and at the end of a full braking operation of said element, said device being freely adjustable by direct pressure of the element in the direction of brake operation but adapted to limit the return stroke, whereby after such adjustment the return of said element will be limited to a more advanced position, and a heat responsive element directly exposed to and in intimate heat exchange relation with the retarded member adapted in response to heating of the braking means to alter the position at which readjustment occurs and thereby to avoid false adjustment of the stop position due to thermal expansion of the retarded means.

2. In a brake mechanism the combination of a retarded member and retarding means, a thermally expansible stop member in intimate heat-exchange relation with the retarded member, the retarding means being adapted to be forced into frictional contact with the retarded member, and the expansible stop limiting the return movement of the retarding means, and said expansible stop being anchored at its end remote from the retarding means against movement caused by the return of the retarding means, but being freely adjustable forward in such a direction as to allow the retarding means to be forced into frictional contact with the retarded member.

GEORGE S. LANE.